UNITED STATES PATENT OFFICE.

JOHN H. GORDON, OF BROOKS, MAINE.

IMPROVEMENT IN SHOE-BLACKING.

Specification forming part of Letters Patent No. 203,138, dated April 30, 1878; application filed March 2, 1878.

*To all whom it may concern:*

Be it known that I, JOHN H. GORDON, of Brooks, in the county of Waldo and State of Maine, have invented a new and valuable Improvement in Shoe-Blacking; and I do hereby declare that the following is a full, clear, and exact description of the same.

The nature of my invention consists in a compound for liquid shoe-polish, as will be hereinafter more fully set forth, and pointed out in the claim.

The liquid polish is composed of the following ingredients, in about the following proportions, viz: Alcohol, one gallon; water, one gallon; gum-shellac, four pounds; sal-soda, one-half pound; castor-oil, eight fluid-ounces; lamp-black, one-fourth pound; and it is prepared in the following manner:

Dissolve two pounds of gum-shellac in the alcohol. To the one gallon of water add the sal-soda, and after this is dissolved add two pounds of gum-shellac. Apply a gentle heat to this, and in twenty-four hours it will all be dissolved. By the addition of the sal-soda the gum-shellac will be dissolved in water. The two mixtures or solutions of gum-shellac are then mixed together, after which the castor-oil is added, and the mixture agitated for a few minutes; then add one-fourth pound of lamp-black, and the polish will be ready for use in twenty-four hours.

This polish should be well shaken before using, and applied with a brush, the boot or shoe being dried before applying the polish. After the blacking is dry, polish with a dry cloth or brush.

I am aware that alcohol, gum-shellac, gum-camphor, and lamp-black have heretofore been used with other ingredients in the manufacture of oil-blacking for harness-leather. Such elements as above stated are not, broadly, claimed in this application; but

What I claim as new, and desire to secure by Letters Patent, is—

The within-described liquid shoe-polish, consisting of alcohol, water, gum-shellac, sal-soda, castor-oil, and lamp-black, in the proportions herein set forth.

In testimony that I claim the above I have hereunto subscribed my name in the presence of two witnesses.

JOHN HENRI GORDON.

Witnesses:
 J. W. JONES,
 A. H. DAVIS.